United States Patent [19]

Ohya

[11] Patent Number: 5,800,642
[45] Date of Patent: Sep. 1, 1998

[54] PNEUMATIC TIRE, MOLD INCLUDING VENT GROOVES, AND METHOD

[75] Inventor: Yukihide Ohya, Kobe, Japan

[73] Assignee: Sumitomo Rubber Industries, Ltd., Hyogo-ken, Japan

[21] Appl. No.: 677,871

[22] Filed: Jul. 10, 1996

[51] Int. Cl.$^6$ .......................... B29C 33/10; B29D 33/00; B60C 11/01; B60C 101/00
[52] U.S. Cl. ..................... 152/209 R; 156/110.1; 264/326; 425/28.1; 425/812
[58] Field of Search ............... 156/87, 110.1, 156/286; 152/209 R, 209 D, DIG. 3; 264/326, 328.3, 501, 315; 425/28.1, 812; 249/141

[56] References Cited

U.S. PATENT DOCUMENTS

| 3,467,160 | 9/1969 | Oguri . |
| 5,066,209 | 11/1991 | Schmaderer et al. . |
| 5,152,951 | 10/1992 | Ahmad et al. ............... 425/812 |

FOREIGN PATENT DOCUMENTS

| 0342908A2 | 11/1989 | European Pat. Off. . |
| 1045448 | 11/1953 | France . |
| 54-69191 | 6/1979 | Japan ............... 425/28.1 |
| 62-96107 | 5/1987 | Japan ............... 152/209 R |
| 5-138656 | 6/1993 | Japan . |
| 5-177644 | 7/1993 | Japan ............... 425/28.1 |
| 6-87303 | 3/1994 | Japan ............... 152/209 R |

OTHER PUBLICATIONS

Patent Abstracts of Japan, vol. 15, No. 120 (M–1096) 25 Mar. 1991 (Abstract, JP 03 009817 A).
Patent Abstracts of Japan, vol. 017, No. 520 (M–1482) 20 Sep. 1993 (Abstract, JP 05 138656 A).

*Primary Examiner*—Steven D. Maki
*Attorney, Agent, or Firm*—Birch, Stewart, Kolasch & Birch, LLP

[57] ABSTRACT

A pneumatic tire, a tire making method and a tire vulcanizing mold are disclosed. The tire has a pair of rounded or tapered shoulder portions each of which is provided with a circumferentially extending narrow groove for improving the wandering performance. The mold is provided with a tread molding face and shoulder molding faces. Each of the shoulder molding faces is provided with a protrusion for forming the above-mentioned narrow groove. The protrusion is provided with slits for forming thin partition walls in the narrow groove. The tread molding face is provided with vent holes. And vent grooves each of which extends from one of the slits in the shoulder molding face into the tread molding face is provided. As a result, no spue is formed in the tire shoulder portions and the tire appearance is improved. And the productivity can be improved.

5 Claims, 6 Drawing Sheets

PNEUMATIC TIRE, MOLD INCLUDING VENT GROOVES, AND METHOD

The present invention relates to a pneumatic tire provided in the shoulder portion with narrow grooves, and a method of making the same, and further a tire vulcanizing mould used in the tire making method.

Recently, heavy duty tires for trucks, buses and the like have tended to include a wider tread.

In such a wide tread tire, the shoulder portion (b) of the tread (a) are provided with circumferentially extending narrow grooves (c) for example as shown in FIG. 7 in order to decrease a wandering phenomenon when the tire gets over height-differed part on the road surface such as rut and the like. The narrow grooves (c) are formed, during vulcanizing the tire, such that blades (e) disposed in the tire vulcanizing mould are pressed into the tread rubber as shown in the figure. The blades (e) divide the rubber into two parts (g1) and (g2) and the flow of rubber is hindered by the blades (e). Thus, a rubber void is especially liable to occur in the upper end (f) of the axially outer part (g2) of the blades (e).

Hitherto, therefore, in an attempt to prevent rubber voids, the mould is provided with well known vent holes (d) extending from the upper end (f) of the outside part (g2). Thus, the molded tire has a large number of spues formed by the vent holes, and it is necessary to cut off the spues.

It is easy to cut off the spues in relatively rigid tread elements in a relatively flat central tread portion by means of machinery.

However, it is difficult to cut off the spues in the axially outer part (g2) without tearing off the rubber because this part (g2) is thin and thus not strong. Further, it is difficult to cut off the spues without injuring the tread surface in the central portion because the tire diameter in this part is smaller than that in the central portion, thus it is difficult to avoid the contact of the cutting blades with the central portion. Therefore, the tire appearance is liable to be degraded. If the spues are cut off by means of hand tools, the production efficiency is very low.

In the laid-open Japanese patent application No. JP-A-5-138656, a tire vulcanizing mould is disclosed, wherein, as shown in FIG. 8, the vent hole (j) comprises a narrow slit-like inner part (j1) located adjacent to the tire to be molded, a thicker outer part (j2) and a tapered middle part (j3).

As the inner part (j1) is a narrow slit, the resistance increases and the growth of spue into the vent hole can be controlled.

If this type of vent hole is employed as the above-mentioned vent hole (d) in the outside part (g2), the tip or edge portion of this part (g2) is torn off together with spues when demolding the tire because the outside part (g2) is thin similarly to the inner part (j1). Thus, the tire appearance is degraded to diminish the trade value. Further, the torn-off rubber remains and plugs up the vent holes.

It is therefore, a general object of the present invention to provide a pneumatic tire which is provided in the rounded or tapered shoulder portions with narrow grooves for improving the wandering performance and which has neither spue nor trace in the shoulder portions and thus the tire appearance is improved.

Another object of the present invention is to provide a vulcanizing mould for the above-mentioned pneumatic tire, by which bare of rubber in the tire shoulder portion especially on the axially outside of the narrow groove is prevented without forming spues and preventing vent holes from being plugged up by torn-off rubber.

A further object of the present invention is therefore, to provide a method of making the above-mentioned pneumatic tire by using the above-mentioned vulcanizing mould.

According to one aspect of the present invention, a tire vulcanizing mould comprises a tread molding face for forming the tread surface of a tire a pair of buttress molding faces for forming the buttress portions of the tire, a pair of rounded or tapered shoulder molding faces for forming the shoulder portions of the tire, each extending between one of the axial edges of the tread molding face and the radially outer edge of one of the buttress molding faces, the tread molding face provided with vent holes, each of the shoulder molding faces provided with a protrusion for forming a circumferentially extending narrow groove of the tire, the protrusion provided with slits for forming thin partition walls in the narrow groove of the tire, and vent grooves each extending from one of the slits in the shoulder molding face into the tread molding face.

Preferably, each of the vent grooves extends to one of the vent holes in the tread molding face from one of the slits in the shoulder molding face, thereby forming a vent continuously extending from the axially outside of the protrusion to the outside of the mould.

Embodiments of the present invention will now be described in detail in conjunction with the accompanying drawings, in which.

Figure 3:
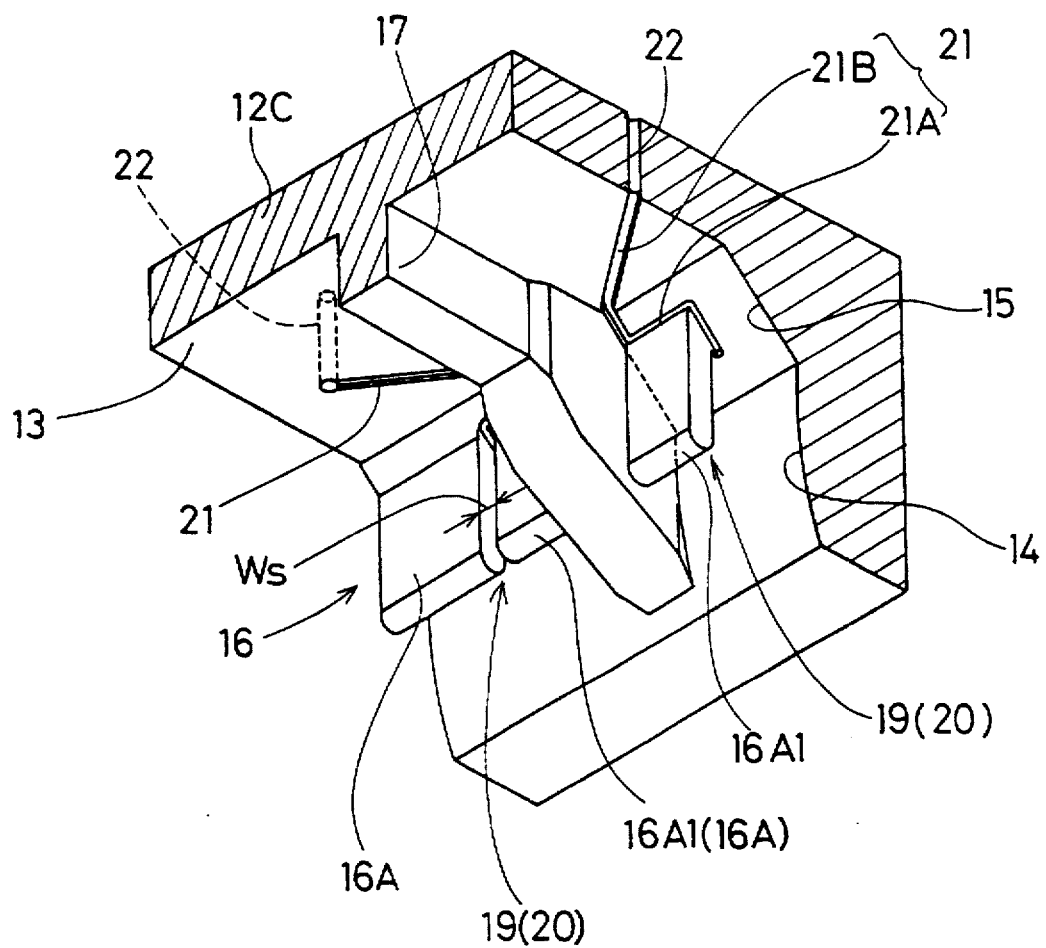
Figure 4:
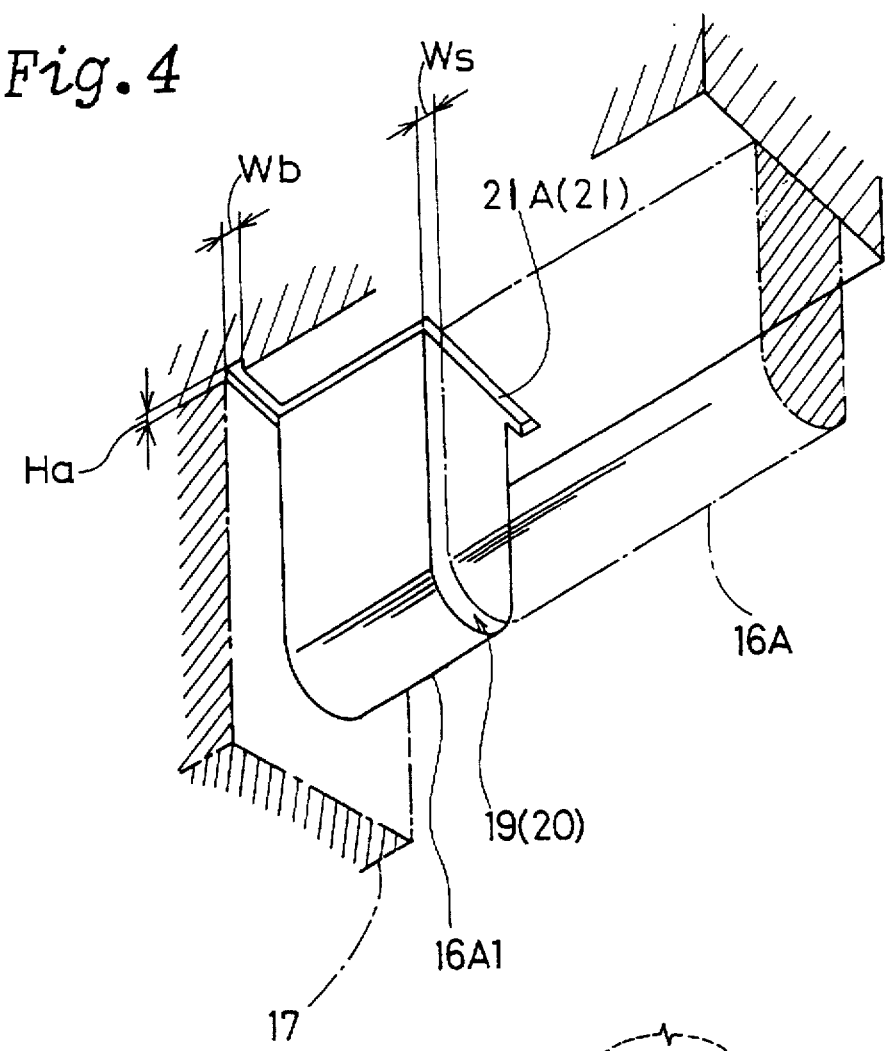
Figure 5:
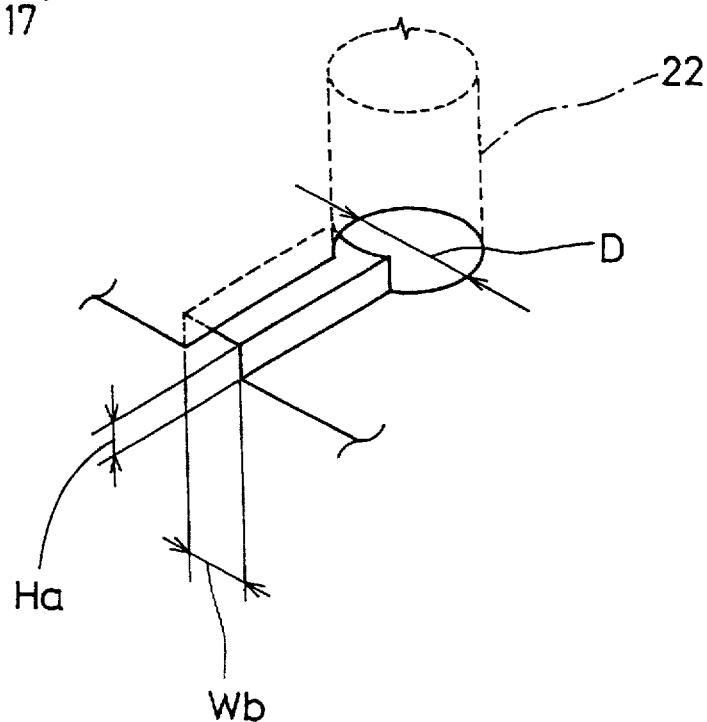
Figure 6:
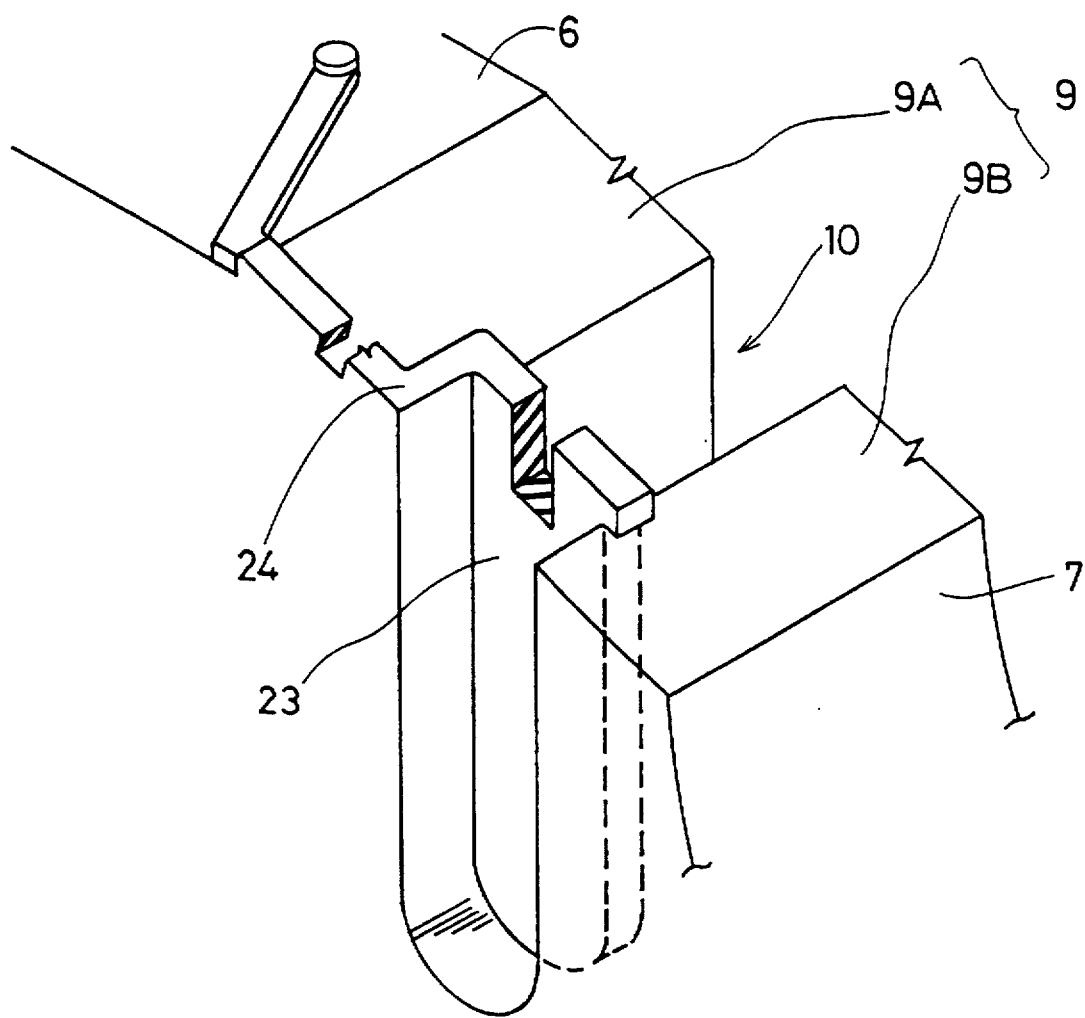
Figure 7:
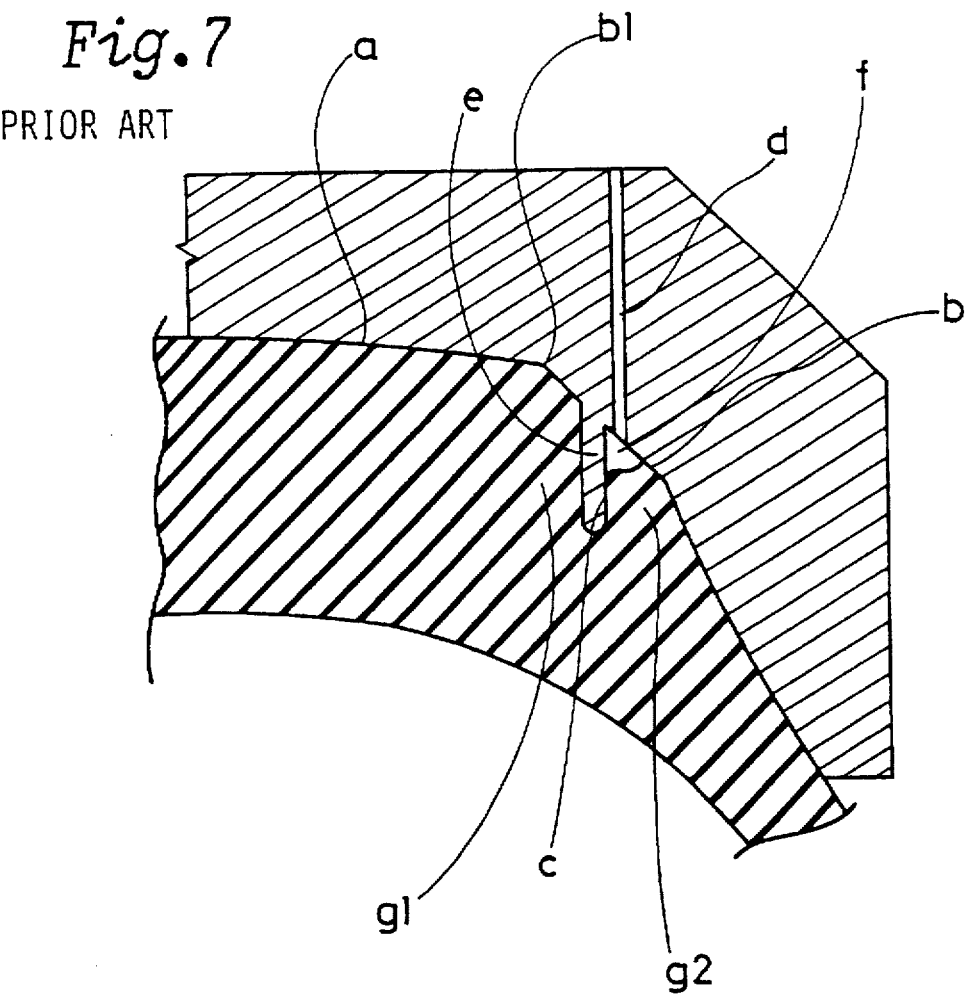
Figure 8:
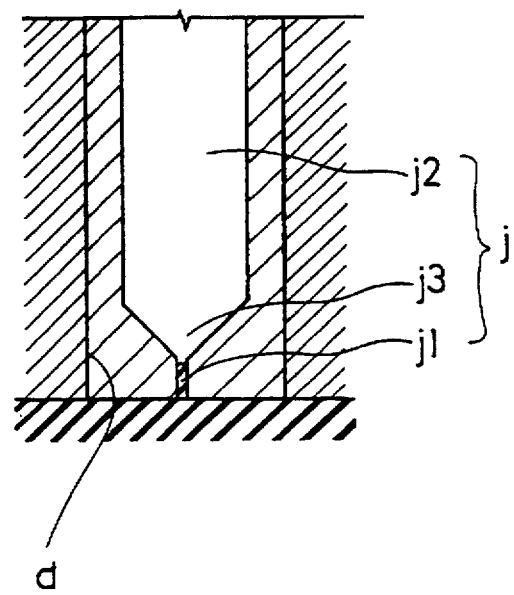

FIG. 3 is a schematic perspective view showing a vent hole 22 and vent groove 21 and a protrusion 16 and slits 19 provided in the molding faces of the mould;

FIG. 4 is an enlarged perspective view showing one of the vent grooves;

FIG. 5 is an enlarged perspective view showing the junction of the vent groove and vent hole;

FIG. 6 is an enlarged perspective view showing the shoulder portion of the pneumatic tire; and FIGS. 7 and 8 are schematic cross sectional views each showing a prior art.

Figure 1:
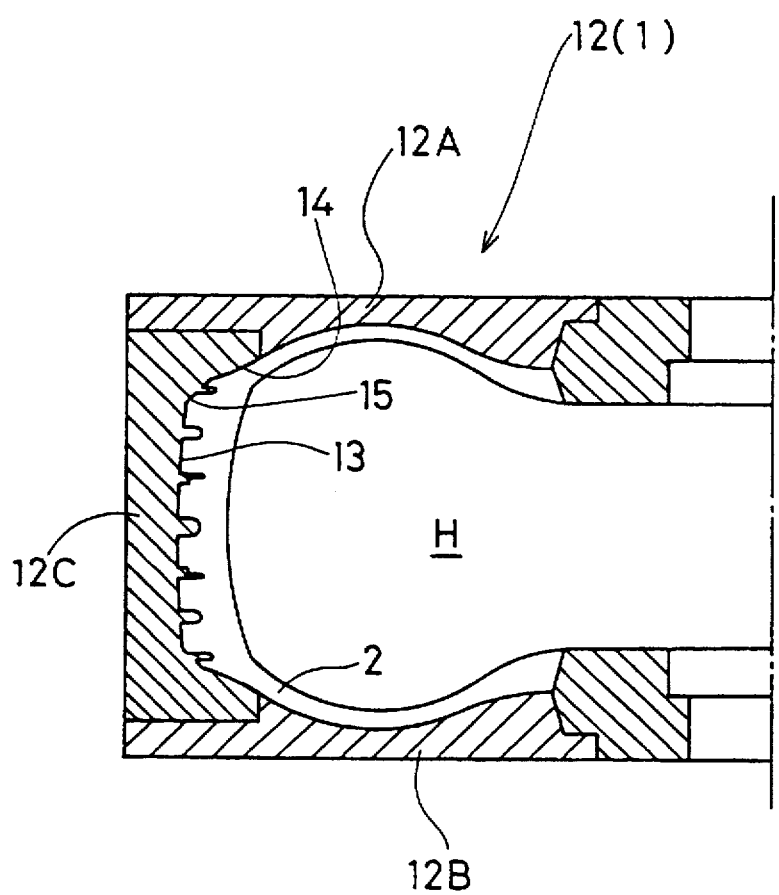
FIG. 1 is a cross sectional view showing a tire vulcanizing mould according to the present invention.
Figure 2:
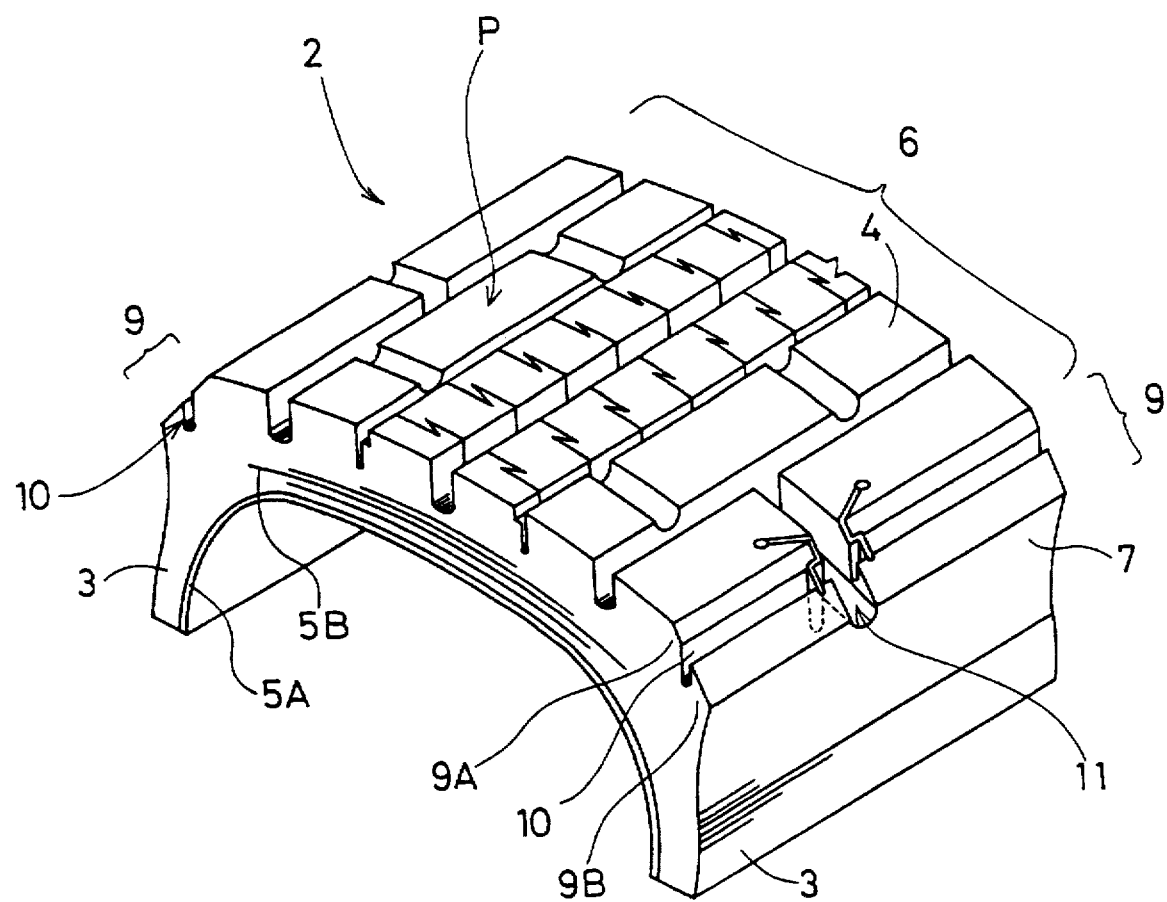
FIG. 2 is a perspective view showing a pneumatic tire according to the present invention.

In FIGS. 1 and 2 showing a tire vulcanizing mould 1 and the molded tire 2 according to the present invention, the tire 2 is a pneumatic tire comprising a tread portion 4, a pair of bead portions, a pair of sidewall portions 3 extending between the tread edges and bead portions, a toroidal carcass 5A extending between the bead portions, and a belt 5B. The pneumatic tire 2 is of the so called taper shoulder type shown in FIG. 2, or round shoulder type (not shown) in which each shoulder portion 9 defined between one of the axial edges of the tread surface 6 and the radially outer edge of the tire buttress portion 7 is tapered axially outwards or rounded.

In this embodiment, the taper angle of the shoulder portions 9 is constant and in the range of from 30 to 60 degrees with respect to the tire axis.

Here, the buttress portion 7 is a radially outermost part of the sidewall portion 3. The tread surface 6 means the ground contacting area when the tire is mounted on a standard rim and inflated to a normal inner pressure and then loaded with a normal load. The standard rim is the rim officially approved for the tire by, for example JATMA (Japan), TRA (USA), ETRTO (Europe) and the like, called as normal rim or measuring rim. The normal inner pressure and normal load are the maximum air pressure and maximum load specified for the tire by the same association or organization.

The tread portion 4 is provided with a tread pattern P comprising circumferentially extending grooves and axial grooves, which are disposed in the ground contacting area 6. In this embodiment shown in FIG. 2, three wide grooves and two narrow grooves extend straight in the circumferential direction of the tire. And axial grooves extend between the axially outer wide circumferential grooves and the adjacent narrow circumferential grooves. Between the central wide circumferential groove and the narrow circumferential grooves, zigzag sipes extend.

In each of the shoulder portions 9, a circumferentially extending straight narrow groove 10 is disposed in order to improve wandering as explained above, whereby the shoulder portion 9 is divided into two parts, an axially inner part 9A and an axially outer part 9B.

Further, axial grooves 11 are disposed to cross the narrow groove 10. The axial grooves 11 extends from the axially outermost main groove within the tread surface 6 to the outer surface of the tire buttress portion 7 and the shoulder portion 9.

In a cross section of the tire including the tire axis, the tread surface 6 is defined by a convex arc having the center on the tire equator and a single radius of curvature R1 of from 400 to 1500 mm.

The outer surface of the tire buttress portion 7 is defined by an inclined straight line or a concave arc.

On the other hand, the mould 1 for vulcanizing the tire 2 in this embodiment comprises a main mold 12. As shown in FIG. 1, the main mold 12 comprises an upper part 12A, a lower part 12B, an annular part 12C collectively formed by a plurality of circumferentially arranged sector plates. These parts 12A–12C collectively form a tire vulcanizing room H in which a raw tire is inserted.

A tread molding face 13 for forming the tread surface 6, a buttress molding face 14 for forming the buttress portion 7, and a shoulder molding face 15 for forming the shoulder portion 9 are provided in the inner surface of the annular part 12C as shown in FIG. 3.

The shoulder molding face 15 is provided with a protrusion 16 for forming the tire narrow groove 10 and a rib block 17 for forming the tire axial groove 11.

The protrusion 16 is provided with a plurality of thin slits 19 extending all over the height thereof, whereby the protrusion 16 is divided into a plurality of pieces 16A.

In this embodiment, the slits 19 are disposed adjacently to the rib blocks 17 as best shown in FIG. 3 and FIG. 2. As a result, the above-mentioned pieces 16A include smaller pieces 16A1 disposed between the slits 19 and rib block 17.

Further, the annular part 12C is provided in the tread molding face 13 with vent holes 22 penetrating the main mold 12.

Furthermore, the annular part 12C is provided in the inner surface with vent grooves 21.

The vent groove 21 is a small groove having a width (Wb) of from 0.5 to 2.0 mm and a depth (Ha) of from 0.5 to 2.0 mm, and extending from the slits 19 through the shoulder molding face 15 into the tread molding face 13. The vent groove 21 comprises a first groove part 21A and a second groove part 21B. The first groove part 21A extends in the shoulder molding face 15 through the slit 19 while being bent along the roots of the narrow width piece 16A1 and rib block 17. The second groove part 21B continued from the first groove part 21A and extending in the tread molding face 13. In this example, one end of the second groove part 21B is connected to one of the vent holes 22.

Thus, during vulcanizing the tire, the tread rubber can flow between the inside part 9A and outside part 9B of the shoulder portion 9 through the slits 19 of the protrusion 16. The air which used to be remained in the outside part 9B can be discharged from the vent hole 22 through the vent groove 21. Thus, it is possible to fully control the occurrence of bare of the tread rubber.

As the vent grooves 21 extends to the vent holes 22 located in the tread molding face 13, no spue is formed in the shoulder portion 9. Accordingly, a tread damage resulting from the cutting of the spues in the shoulder portion can be prevented. Further, the vent holes can be prevented from being plugged up by the torn-off rubber from the outside part (g2).

Further, as the vent groove 21 extends along the roots of the piece 16A1 and rib block 17, a decrease in the looks of the tire can be prevented.

Furthermore, the conventional vent holes can be utilized as the vent holes 22 to which the vent grooves 21 are connected, and the number of the vent holes can be decreased.

Again turning to the tire formed by such mould, as shown in FIG. 6, the narrow groove 10 is provided therein with thin partition walls 23 which are formed by the slits 19. And the top surfaces of the partition wall 23 and shoulder portion 9 and tread surface 6 are provided with a continuous small height rib 24 which is formed by the vent groove 21. Thus, the rib 24 has a height of from 0.5 to 2.0 mm, and a width of from 0.5 to 2.0 mm.

The width (Ws) of the slits 19 or the partition walls is substantially equal to the width (Wb) of the the vent grooves 21 or the rib 24.

The diameter D of the vent holes 22 is 0.5 to 2.0 mm.

If the width (Wb), depth (Ha), width (Ws) and diameter (D) are less than 0.5 mm, the occurrence of bare of rubber can not be fully controlled, and it is difficult to make such mould. If the width (Wb), depth (Ha), width (Ws) and diameter (D) are more than 2.0 mm, the sizes of the partition wall 23, rib 24 and spues are large and the tire appearance becomes worse.

Preferably, the width (Wb) is in the range of from 0.8 to 1.0 mm, the depth (Ha) is in the range of from 0.5 to 1.0 mm, the width (Ws) is in the range of from 0.8 to 1.0 mm, and the diameter (D) is in the range of from 0.8 to 1.5 mm.

For the configuration of the opening of the vent holes 22, round shapes, e.g. circle, oval and the like, and also polygonal shapes inclusive of a slit-like shape can be used.

The vent grooves 21 are preferably formed so as to have a constant depth and a constant width. However, the width (Wb) and depth (Ha) can be varied within the above-mentioned ranges partially or gradually along the longitudinal direction thereof.

In order to manufacture the above-mentioned pneumatic tire, a method similar to the conventional method can be used. As has been understood from the foregoing explanation, the difference or improvement therefrom mainly resides in the steps of vulcanizing a raw tire in the above-mentioned mould.

According to the present invention, a method of making a pneumatic tire comprises the steps of:

making a raw tire by winding a raw carcass and a pair of bead cores on an expandable tire building drum, expanding the tire building drum to shape the carcass into a toroidal form, applying a belt around the carcass, and applying rubber strips for the tread, sidewall and bead portions on the assembly;

putting the assembled raw tire in the above-mentioned mould;

heating the raw tire in the mould for vulcanization;

taking out the vulcanized tire from the mould; and optionally cutting off the spues in the tread portion by means of machinery.

However, the spue cutting-off operation is not necessary for the shoulder portions since there is no spue in the shoulder portions.

As explained above, according to the present invention, the pneumatic tire has neither spue nor trace in the shoulder portions. Thus, the tire appearance is improved. The tire vulcanizing mould can prevent bare of rubber in the tire shoulder portions without forming spues, and also prevent vent holes from being plugged up by torn-off rubber. In the method, the spue cutting-off operation for the shoulder portions is omitted, and the productivity can be improved.

I claim:

1. A pneumatic tire comprising:

a tread portion having a tread surface, the tread surface having a radius of curvature of 400 to 1500 mm, a pair of buttress portions, and a pair of shoulder portions between the tread portion and buttress portions, the shoulder portions tapered axially outwards at an angle of 30 to 60 degrees with respect to an axis of the tire, a circumferentially extending narrow groove disposed in each of the shoulder portions so as to axially divide this portion into an axially inside part and an axially outside part, a plurality of thin partition walls disposed in each of the narrow grooves, small ribs each disposed on the radially outer surface of the tread portion, the radially outer surface of the axially inside part of one of the shoulder portions and the radially outer surface of one of the thin partition walls, the small ribs extending continuously from the axially outside part of the shoulder portion into the tread portion, the small ribs having a height of from 0.5 to 2.0 mm and a width of more than 0.5 mm but not more than 2.0 mm, and each of the partition walls having a thickness of from 0.5 to 2.0 mm and the small rib on the radially outer surface of the partition wall protruding from the narrow groove.

2. A mould for vulcanizing a pneumatic tire, the pneumatic tire comprising a tread portion having a tread surface, the tread surface having a radius of curvature of 400 to 1500 mm, a pair of buttress portions, and a pair of shoulder portions between the tread portion and buttress portions, the shoulder portions tapered axially outwards at an angle of 30 to 60 degrees with respect to an axis of the tire and provided with circumferentially extending narrow grooves, the mould comprising a tread molding face having axial edges for forming the tread surface of the tire, a pair of buttress molding faces each having a radially outer edge for forming the buttress portions of the tire, a pair of tapered shoulder molding faces for forming the shoulder portions of the tire, each extending between one of the axial edges of the tread molding face and the radially outer edge of one of the buttress molding faces, the tread molding face provided with vent holes, each of the shoulder molding faces provided with a protrusion for forming one of the circumferentially extending narrow grooves of the tire, the protrusion provided with slits for forming thin partition walls in each of the narrow grooves of the tire, vent grooves each extending from and positioned over one of the slits in the shoulder molding face into the tread molding face for forming a rib on one of the partition walls which protrudes from the tread surface and the narrow groove, each said vent groove having a depth of from 0.5 to 2.0 mm and a width of more than 0.5 mm but not more than 2.0 mm, and each said slit having a width of from 0.5 to 2.0 mm.

3. The vulcanizing mould according to claim 2, wherein each of the vent grooves extends to one of the vent holes in the tread molding face from one of the slits in the shoulder molding face.

4. A method of making a pneumatic tire comprising the steps of making a raw tire, putting the raw tire in the mould according to claim 2, heating the raw tire in the mould for vulcanization, and taking out the vulcanized tire from the mould.

5. The method according to claim 4, which further comprises the steps of cutting off spues in the tread portion by means of machinery, but no spue-cutting-off step for the shoulder portions.

* * * * *

UNITED STATES PATENT AND TRADEMARK OFFICE
CERTIFICATE OF CORRECTION

PATENT NO.   : 5,800,642
DATED        : September 1, 1998
INVENTOR(S)  : Yukihide OHYA It is certified that error(s) appears in the above-identified patent and that said Letters Patent is hereby corrected as shown below:

On the title page, insert item:

[30] Foreign Application Priority Data
July 10, 1995     [JP]      7-173468

Signed and Sealed this

Twenty-third Day of February, 1999

Attest:

Q. TODD DICKINSON

Attesting Officer

Acting Commissioner of Patents and Trademarks